US012652576B2

(12) United States Patent
Yu

(10) Patent No.: US 12,652,576 B2
(45) Date of Patent: Jun. 9, 2026

(54) PER SESSION LINK LOAD BALANCING OF IPSEC TUNNELS OVER MULTIPLE UPLINKS TO SAME IPSEC GATEWAY

(71) Applicant: Fortinet, Inc., Sunnyvale, CA (US)

(72) Inventor: Kun Yu, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 537 days.

(21) Appl. No.: 18/072,298

(22) Filed: Nov. 30, 2022

(65) Prior Publication Data

US 2024/0179565 A1     May 30, 2024

(51) Int. Cl.
*H04L 45/24* (2022.01)
*H04L 9/40* (2022.01)
*H04W 28/08* (2023.01)

(52) U.S. Cl.
CPC ....... *H04W 28/0858* (2020.05); *H04L 63/029* (2013.01); *H04W 28/0892* (2020.05)

(58) Field of Classification Search
CPC .......... H04W 28/0858; H04W 28/0892; H04L 63/029; H04L 45/24; H04L 47/125; H04L 67/562; H04L 47/215; H04L 69/163; H04L 67/146; H04L 67/141; H04L 69/14; H04L 67/1001
See application file for complete search history.

(56) References Cited

U.S. PATENT DOCUMENTS

| | | | | |
|---|---|---|---|---|
| 11,108,851 | B1 * | 8/2021 | Kurmala | H04L 41/0816 |
| 2022/0393967 | A1 * | 12/2022 | Solanki | H04L 12/4641 |
| 2023/0254289 | A1 * | 8/2023 | Chandranna | H04L 63/166 |
| | | | | 726/11 |
| 2023/0262035 | A1 * | 8/2023 | Huang | H04L 63/0272 |
| | | | | 713/151 |

* cited by examiner

*Primary Examiner* — Mohammed S Chowdhury
*Assistant Examiner* — Muhammad Ainul Huda
(74) *Attorney, Agent, or Firm* — Law Office of Dorian Cartwright; Dorian Cartwright

(57) ABSTRACT

A first data packet can be forwarded to a virtual SDWAN interface which has multiple IPSec tunnels as members, each of which is disposed over a different uplink, wherein the multiple IPSec tunnels each connect to the remote SDWAN controller. Load balancing of the particular session is performed relative to other sessions by selecting one of the multiple uplinks for transmission to the remote SDWAN controller. Phase 2 of IPSec is set up for the particular session by updating an IPSec phase 2 table with the selected uplink associated with the particular session, to direct subsequent packets of the same session.

11 Claims, 5 Drawing Sheets

300

320

PER SESSION LINK LOAD BALANCING OF IPSEC TUNNELS OVER MULTIPLE UPLINKS TO SAME IPSEC GATEWAY

FIELD OF THE INVENTION

The invention relates generally to machine learning and computer networking, and more specifically, for load balancing on a data communication network, on a per-session basis, between multiple uplinks for IPSec tunnels to a remote SDWAN controller with a dynamic selector.

BACKGROUND

The state-of-art secured SDWAN (Software Defined Wide Area Network) steers traffic among IPSec (Internet Protocol security) tunnels. It is an Internet Engineering Task Force (IETF) standard suite of protocols between 2 communication points across the IP network that provide data authentication, integrity, and confidentiality. It also defines the encrypted, decrypted and authenticated packets.

However, although these IPSEC tunnels are logically consistent from the view of SDWAN, they are built on heterogeneous physical links. The local end of a tunnel could be built on the high-speed broadband link, while the remote end is built on the LTE (long-term evolution) wireless link. This tunnel is expected to get a lower priority to steer traffic because LTE could incur expensive cost although it may keep a good quality. Unfortunately, the local SDWAN has no knowledge of the remote end. The knowledge cannot be acquired by the current quality detection techniques, such as sending probes periodically, either. Customers are calling for an innovation to guide the SDWAN to steer traffic based on the remote end's information.

What is needed is a robust technique for load balancing on a data communication network, on a per-session basis, between multiple uplinks for IPSec tunnels to a remote SDWAN controller with a dynamic selector.

SUMMARY

To meet the above-described needs, methods, computer program products, and systems for load balancing on a data communication network, on a per-session basis, between multiple uplinks for IPSec tunnels to a remote SDWAN controller with a dynamic selector.

In one embodiment, a first data packet is received from a particular session of a client as a source, having a destination behind the remote SDWAN controller. The first data packet can be forwarded to a virtual SDWAN interface which has multiple IPSec tunnels as members, each of which is disposed over a different uplink, wherein the multiple IPSec tunnels each connect to the remote SDWAN controller.

In another embodiment, load balancing of the particular session is performed relative to other sessions by selecting one of the multiple uplinks for transmission to the remote SDWAN controller. Phase 2 of IPSec is set up for the particular session by updating an IPSec phase 2 table with the selected uplink associated with the particular session. Responsive to receiving subsequent data packets of the particular session, the IPSec phase 2 table is referred to and the subsequent data packets of the particular session are forwarded to the selected IPSec tunnel.

Advantageously, network performance is improved with better throughput with load balancing.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for load balancing on a data communication network, on a per-session basis, between multiple uplinks for IPSec tunnels to a remote SDWAN controller with a dynamic selector. One of ordinary skill in the art will recognize many alternative embodiments that are not explicitly listed based on the following disclosure.

I. Systems for Per-Session IPSec Load Balancing (FIGS. 1-2)

Figure 1:
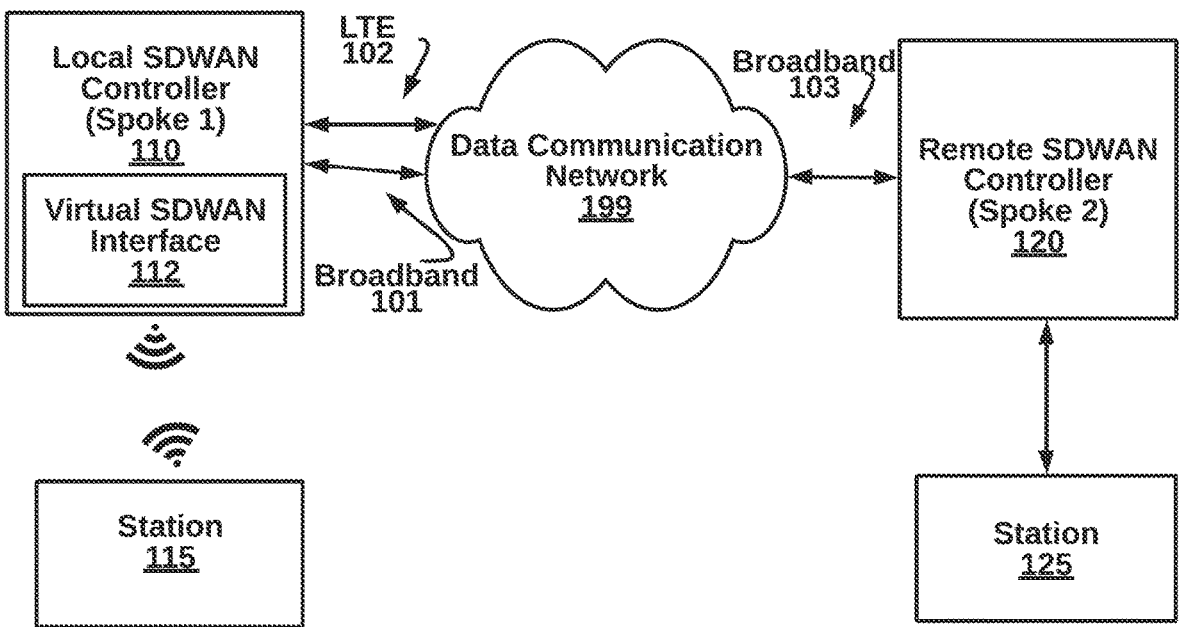
FIG. 1 is a high-level block diagram illustrating a system for load balancing on a data communication network, on a per-session basis, between multiple uplinks for IPSec tunnels to a remote SDWAN controller with a dynamic selector, according to one embodiment.
Figure 2:
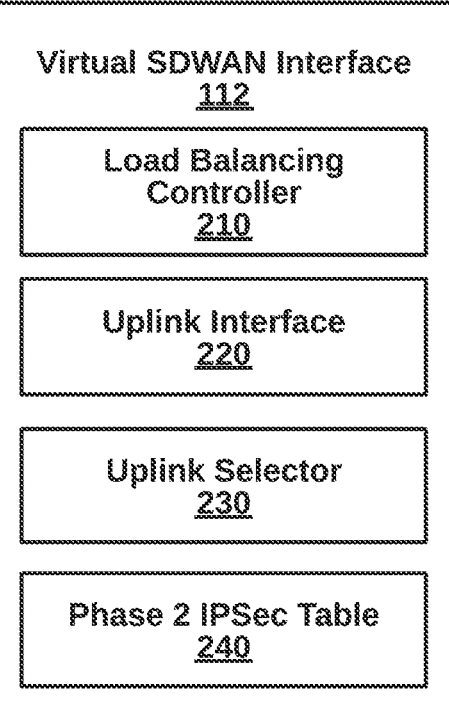
FIG. 2 is a more detailed block diagram illustrating a virtual SDWAN interface of the system of FIG. 1, according to one embodiment.

FIG. 1 is a high-level block diagram illustrating a system 100 for load balancing on a data communication network, on a per-session basis, between multiple uplinks for IPSec tunnels to a remote SDWAN controller with a dynamic selector, according to one embodiment. The system 100 includes a virtual SDWAN interface 112 in a local SDWAN controller 110, and a remote SDWAN controller 120, coupled in communication with a data communication network 199. Other embodiments of the system 100 can include additional network components that are not shown in FIG. 1. For example, there can be more SDWAN gateways, access points and more stations. There can also be network devices such as switches, routers, fire walls, proxy servers, network gateways, network managers, and the like. The components can be implemented in hardware and/or software, such as by the computing device of FIG. 5. Many other variations of system 100 are possible.

The components of the system 100 are coupled in communication over the data communication network. The components can be connected to the data communication system via hard wire (e.g., virtual SDWAN interface 112, local SDWAN controller 110, and remote SDWAN controller 120). The components can also be connected via wireless networking (e.g., stations 115, 125). The data communication network 199 can be composed of any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802,11r, and the like. Components can use IPv4 or IPv6 address spaces.

The virtual SDWAN interface 112 selects between multiple uplinks 101,102 for routing each session to the remote SDWAN controller 120, for a first data packet of a new session. Network conditions or other load balancing factors can affect selection decisions. A phase 2 IPSec table tracks uplink selections for subsequent data packets of the same session. The subsequent packets are sent along the same uplink, unless an update has occurred in the midst of a session. As a result of the phase 2 IPSec table, even though two uplinks can have the same 5-tuple, there is no conflict and data packets are routed individually based on selection decisions. The virtual SDWAN interface 112 is described further below in association with FIG. 2.

The local SDWAN controller 110 and the remote SDWAN controller 120 can create VPNs (virtual private networks) for secure communications between station 115 and station 125. In an example data path, a new session is initiated by station 115 by transmitting a first data packet to the local SDWAN controller 110 directly, or indirectly through an intervening access point, and network switches. The local SDWAN controller 110 forwards the first data packet to the virtual SDWAN interface 112, and if a selected uplink exists in the IPSec phase 2 table, the data packet is transmitted on the selected uplink. However, as a first data packet in the session, an uplink is selected by a load balancing technique and following data packets of the same session are sent along the same selection. The local and remote SDWAN controllers 110, 120 can be a sever blade in an array of server blades, a PC (personal computer), a mobile computing device, a laptop device, a smartphone, a tablet device, a phablet device, a video game console, a stationary computing device, an Internet appliance, a virtual computing device, a distributed computing device, a cloud-based computing device, or any appropriate processor-driven device.

The stations 115, 125 use access points to for access to the wired backbone and to other devices on a Wi-Fi network. The stations 115, 125 or clients can be implemented as, for example, a mobile station, STA, client or wireless device, a personal computer, laptop, tablet computer, smart phone, mobile computing device, Internet access applications, end station or any other computing device as described in FIG. 5. The stations 115, 125 are wirelessly couples to access points using a radio and antenna. No pre-configuration or client is needed. The stations 115, 125 can operate according to wireless standards such as IEEE 802.11a, b, g, n, ac, w or any other wireless standard.

FIG. 2 is a more detailed block diagram illustrating the virtual SDWAN interface 110 of the system 100 of FIG. 1, according to one embodiment. The virtual SDWAN interface 110 includes a load balancing controller 210, an uplink interface 220, an uplink selector 230, and an IPSec phase 2 table 240. The components can be implemented in hardware, software, or a combination of both.

The load balancing controller 210 receives a first data packet from a particular session of a client as a source, having a destination behind the remote SDWAN controller. The uplink interface 220 has multiple IPSec tunnels as members, each of which is disposed over a different uplink to the same remote SDWAN controller, and is a possible uplink route. The multiple IPSec tunnels each connect to the remote SDWAN controller. The uplink interface 220 can monitor network conditions for each of the uplinks, tacking failover and failback among tunnels to maintain high availability.

The uplink selector 230 performs load balancing of the particular session relative to other sessions by selecting one of the multiple uplinks for transmission to the remote SDWAN controller. Next, phase 2 of IPSec for the particular session is set up by updating an IPSec phase 2 table 240 with the selected uplink associated with the particular session. To do so, in an embodiment, an IKE initiates authentication of the local SDWAN controller 120 with a remote SDWAN controller 130, to create a tunnel by exchanging IKE packets. The IPSec phase 2 table can be a list of session flows along with uplink selections.

Responsive to receiving subsequent data packets of the particular session, the uplink load balancing controller 210 refers to the IPSec phase 2 table 240 and forwards the subsequent data packets of the particular session to the selected IPSec tunnel.

II. Methods for Per Session IPSec Load Balancing (FIGS. 3-4)

Figure 3:
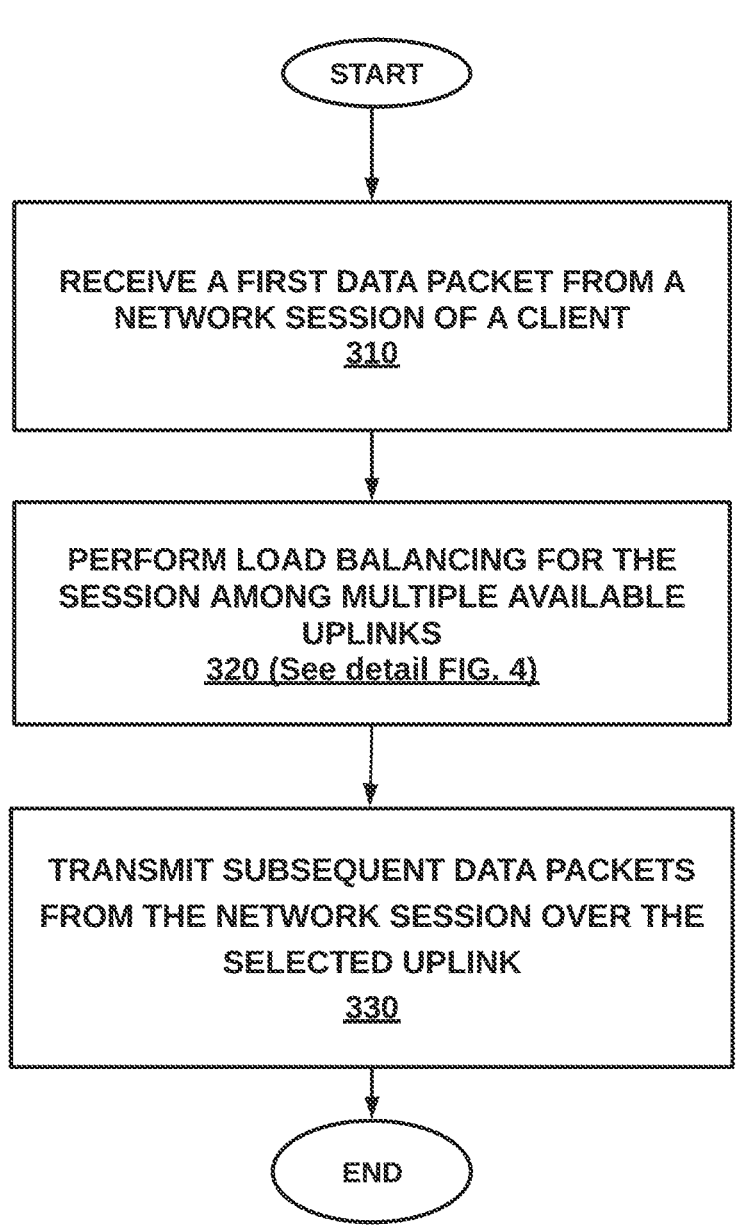
FIG. 3 is a high-level flow diagram illustrating a method for load balancing on a data communication network, on a per-session basis, between multiple uplinks for IPSec tunnels to a remote SDWAN controller with a dynamic selector, according to one embodiment.

FIG. 3 is a high-level flow diagram illustrating a method 300 for load balancing on a data communication network, on a per-session basis, between multiple uplinks for IPSec tunnels to a remote SDWAN controller with a dynamic selector, according to an embodiment. The method 300 can be implemented by, for example, the virtual SDWAN interface 112 of FIG. 1. Many other implementation-specific variations of the method 300 are possible given the present disclosure.

At step 310, responsive to receiving a first data packet is from a particular session of a client as a source having a destination behind the remote SDWAN controller, load balancing amongst multiple uplinks is performed for the particular session, at step 320, as described in more detail below with respect to FIG. 4. Responsive to receiving a subsequent data packets of the particular session, at step 330, the subsequent data packets of the particular session are forwarded to the selected IPSec tunnel.

Figure 4:
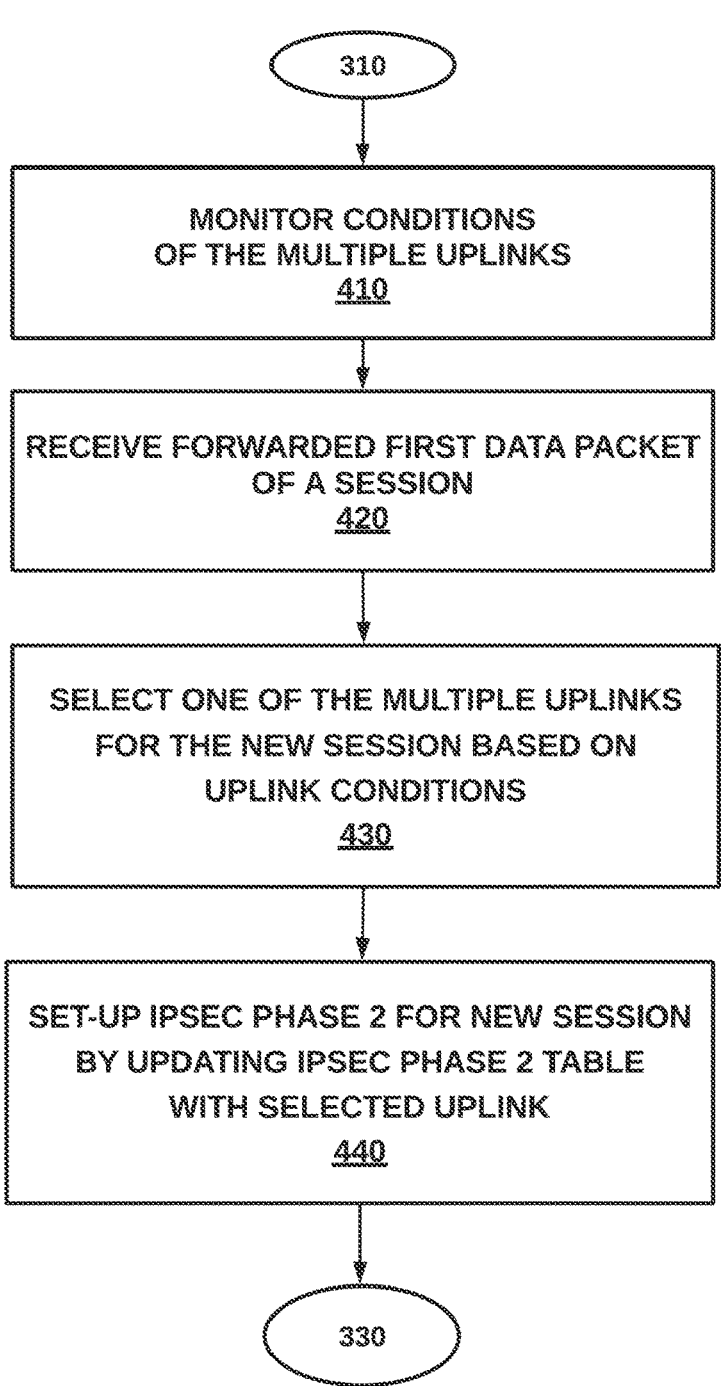
FIG. 4 is a more detailed flow diagram illustrating a step for selecting a link for a particular session, from the method of FIG. 3, according to one embodiment.

Turning to FIG. 4, an example of the session balancing step 420 is set forth. At step 410, multiple uplinks are monitored. In one case, network conditions for each uplink are continuously or periodically evaluated, including throughput, number of sessions, interference, number of clients, historical connections, and the like. At step 420, the first data packet of the particular session is forwarded to a virtual SDWAN interface which has the multiple IPSec tunnels as members. Each member is disposed over a different uplink. The multiple IPSec tunnels each connect to the remote SDWAN controller.

At step 430, load balancing of the particular session is performed relative to other sessions by selecting one of the multiple uplinks for transmission to the remote SDWAN controller, based on the conditions. Many different load balancing techniques are possible. For example, load balancing can alternate links, choose fastest link or least congested link, or any combination of factors. In one embodiment, link selection can be updated based on actual link performance for a particular session, updated network conditions for the links, manual configuration, or for other reasons.

Next, at step 440, phase 2 of IPSec is set up for the particular session by updating an IPSec phase 2 table with the selected uplink associated with the particular session.

III. Computing Device for Deriving Connection Thresholds (FIG. 5)

Figure 5:
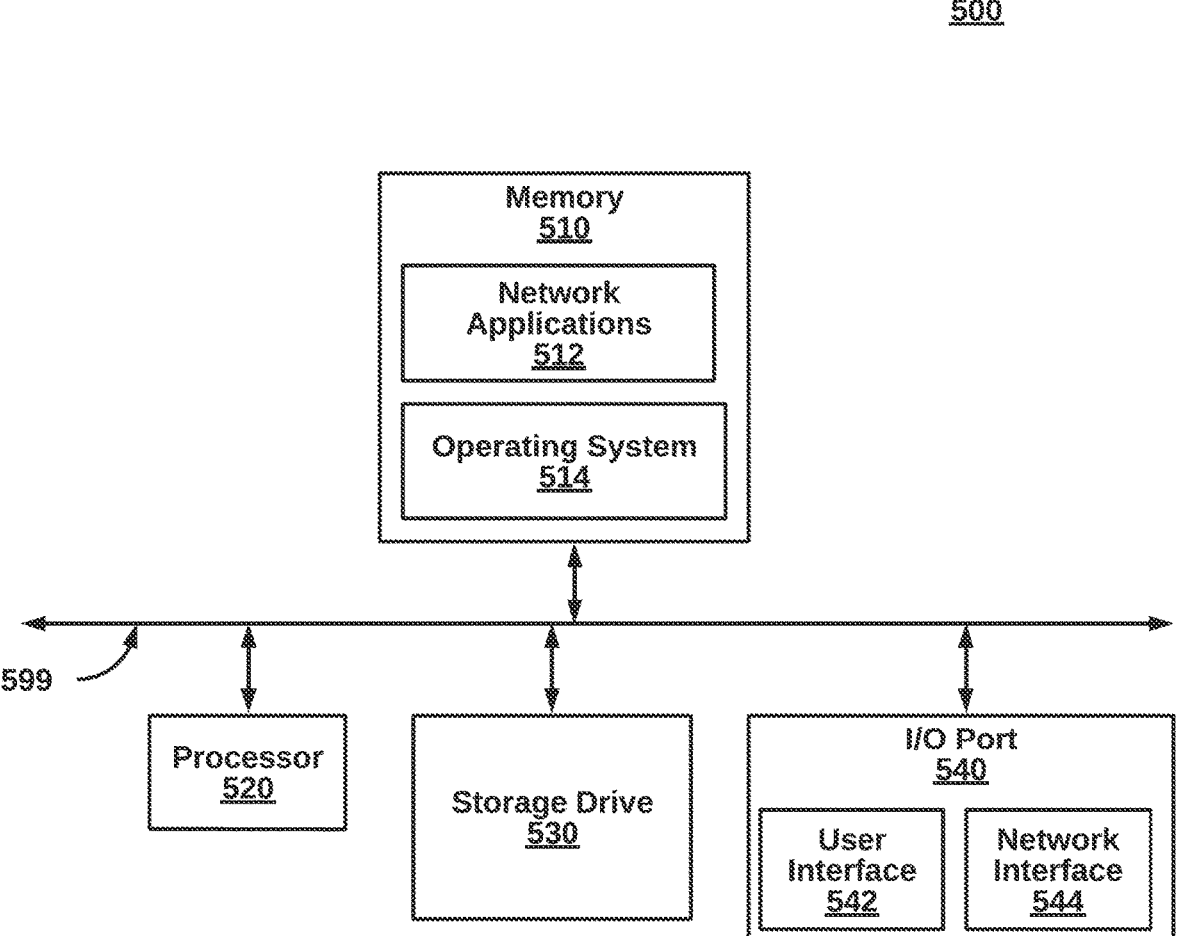
FIG. 5 is a block diagram illustrating an example computing device for the system of FIG. 1, according to one embodiment.

FIG. 5 is a block diagram illustrating an example computing device 500 for use in the system 100 of FIG. 1, according to one embodiment. The computing device 500 is an exemplary device that is implementable for each of the components of the system 100, including local and remote SDWAN controllers 110, 120 and stations 115, 125. Additionally, the computing device 500 is merely an example implementation itself, since the system 100 can also be fully or partially implemented with laptop computers, tablet computers, smart cell phones, Internet access applications, and the like.

The computing device 500, of the present embodiment, includes a memory 510, a processor 520, a hard drive 530, and an I/O port 540. Each of the components is coupled for electronic communication via a bus 550. Communication can be digital and/or analog, and use any suitable protocol.

The memory 510 further comprises network access applications 512 and an operating system 514. Network access applications can include 512 a web browser, a mobile access applications, an access applications that uses networking, a remote access applications executing locally, a network protocol access applications, a network management access applications, a network routing access applications, or the like.

The operating system 514 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 520 can be a network processor (e.g., optimized for IEEE 802.11), a general purpose processor, an access applications-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing elements. The processor 520 can be disposed on silicon or any other suitable material. The processor 520 can receive and execute instructions and data stored in the memory 510 or the hard drive 530.

The storage device 530 can be any non-volatile type of storage such as a magnetic disc, EEPROM, Flash, or the like. The storage device 530 stores code and data for access applications.

The I/O port 540 further comprises a user interface 542 and a network interface 544. The user interface 542 can output to a display device and receive input from, for example, a keyboard. The network interface 544 connects to a medium such as Ethernet or Wi-Fi for data input and output. In one embodiment, the network interface 544 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C #, Oracle® Java, JavaScript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer $2/3$ routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

I claim:

1. A method in a local Software-Defined Wide Area Network (SDWAN) controller for load balancing on a data communication network, on a per-session basis, between multiple uplinks for Internet Protocol Security (IPSec) tunnels to a remote SDWAN controller with a dynamic selector, the method comprising:

receiving a first data packet from a particular session of a client as a source, having a destination behind the remote SDWAN controller;

forwarding the first data packet to a virtual SDWAN interface which has multiple IPSec tunnels as members, each of which is disposed over a different uplink, wherein the multiple IPSec tunnels each connect to the remote SDWAN controller;

performing load balancing of the particular session relative to other sessions by selecting one of the multiple uplinks for transmission to the remote SDWAN controller, including receiving network conditions concerning the multiple uplinks;

setting up phase 2 of IPSec for the particular session by updating an IPSec phase 2 table with the selected uplink associated with the particular session, including initiating authentication of the local SDWAN server with the remote SDWAN server; and responsive to receiving subsequent data packets of the particular session, referring to the IPSec phase 2 table and forwarding the subsequent data packets of the particular session to the selected IPSec tunnel.

2. The method of claim 1, wherein the multiple uplinks comprise three or more uplinks.

3. The method of claim 1, wherein the multiple uplinks comprise one or more of an LTE link and a broadband link.

4. The method of claim 1, wherein the performing load balancing step alternates assignment of new sessions evenly between the multiple uplinks.

5. The method of claim 1, wherein the step of setup up phase 2 comprises a data packet exchange between an IKE of the local SDWAN controller and a IKE of the remote SDWAN controller.

6. A non-transitory computer-readable medium in a local Software-Defined Wide Area Network (SDWAN) SDWAN controller storing instructions that, when executed by a processor, perform a computer-implemented method for load balancing on a data communication network, on a per-session basis, between multiple uplinks for Internet Protocol Security (IPSec) IPSec tunnels to a remote SDWAN controller with a dynamic selector, the method comprising:

receiving a first data packet from a particular session of a client as a source, having a destination behind the remote SDWAN controller;

forwarding the first data packet to a virtual SDWAN interface which has multiple IPSec tunnels as members, each of which is disposed over a different uplink, wherein the multiple IPSec tunnels each connect to the remote SDWAN controller;

performing load balancing of the particular session relative to other sessions by selecting one of the multiple uplinks for transmission to the remote SDWAN controller, including receiving network conditions concerning the multiple uplinks;

setting up phase 2 of IPSec for the particular session by updating an IPSec phase 2 table with the selected uplink associated with the particular session, including initiating authentication of the local SDWAN server with the remote SDWAN server; and responsive to receiving subsequent data packets of the particular session, referring to the IPSec phase 2 table and forwarding the subsequent data packets of the particular session to the selected IPSec tunnel threshold.

7. A local Software-Defined Wide Area Network (SDWAN) SDWAN controller to load balancing on a data communication network, on a per-session basis, between multiple uplinks for Internet Protocol Security (IPSec) IPSec tunnels to a remote SDWAN controller with a dynamic selector, the local SDWAN controller comprising:

a processor;

a network interface communicatively coupled to the processor and to the hybrid wireless network; and a memory, communicatively coupled to the processor and storing:

a load balancing controller to receive a first data packet from a particular session of a client as a source, having a destination behind the remote SDWAN controller;

an uplink interface having multiple IPSec tunnels as members, each of which is disposed over a different uplink, wherein the multiple IPSec tunnels each connect to the remote SDWAN controller;

an uplink selector to perform load balancing of the particular session relative to other sessions by selecting one of the multiple uplinks for transmission to the remote SDWAN controller, including receiving network conditions concerning the multiple uplinks;

wherein the uplink selector sets up phase 2 of IPSec for the particular session by updating an IPSec phase 2 table with the selected uplink associated with the particular session, including initiating authentication of the local SDWAN server with the remote SDWAN server;

wherein responsive to receiving subsequent data packets of the particular session, the load balancing controller refers to the IPSec phase 2 table and forwarding the subsequent data packets of the particular session to the selected IPSec tunnel at the uplink interface.

8. The local SDWAN controller of claim 7, wherein the multiple uplinks comprise three or more uplinks.

9. The local SDWAN controller of claim 7, wherein the multiple uplinks comprise one or more of an LTE link and a broadband link.

10. The local SDWAN controller of claim 7, wherein the performing load balancing step alternates assignment of new sessions evenly between the multiple uplinks.

11. The local SDWAN controller of claim 7, wherein the step of setup up phase 2 comprises a data packet exchange between an IKE of the local SDWAN controller and a IKE of the remote SDWAN controller.

* * * * *